United States Patent [19]

Brezinski

[11] Patent Number: 5,763,368
[45] Date of Patent: Jun. 9, 1998

US005763368A

[54] CORROSION INHIBITED WELL ACIDIZING COMPOSITIONS AND METHODS

[75] Inventor: Michael M. Brezinski, Duncan, Okla.

[73] Assignee: Halliburton Energy Services, Inc., Duncan, Okla.

[21] Appl. No.: 655,539

[22] Filed: May 30, 1996

[51] Int. Cl.$^6$ .......................................... C09K 7/00
[52] U.S. Cl. .................. 507/240; 507/265; 507/934; 507/939
[58] Field of Search ..................... 507/939, 934, 507/265, 240

[56] References Cited

U.S. PATENT DOCUMENTS

| | | | |
|---|---|---|---|
| 2,643,227 | 6/1953 | Hughes et al. | 507/265 |
| 2,814,593 | 11/1957 | Beiswanger et al. | 507/240 |
| 3,076,761 | 2/1963 | Markham | 507/265 |
| 3,378,488 | 4/1968 | Nimerick | 507/265 |
| 3,668,137 | 6/1972 | Gardner | 507/265 |
| 5,096,618 | 3/1992 | Frenier | 252/396 |
| 5,209,859 | 5/1993 | Williams et al. | 507/203 |
| 5,441,929 | 8/1996 | Walker | 507/260 |
| 5,543,388 | 8/1996 | Williams et al. | 507/269 |

*Primary Examiner*—Sharon Gibson
*Assistant Examiner*—Valerie Fee
*Attorney, Agent, or Firm*—Robert A. Kent; Clark Dougherty, Jr.

[57] ABSTRACT

The present invention provides corrosion inhibited well acidizing compositions and methods of using the compositions to acidize wells. The compositions basically comprise an aqueous acid solution, a corrosion inhibitor comprising at least one quaternary ammonium compound and a corrosion inhibitor intensifier comprised of aliphatic carboxylic acids, crude tall oil, tall oil fatty acids, rosin acids and mixtures thereof.

6 Claims, No Drawings

CORROSION INHIBITED WELL ACIDIZING COMPOSITIONS AND METHODS

BACKGROUND OF THE INVENTION

1. Field of the Invention.

The present invention relates to improved corrosion inhibited aqueous acid compositions which are effective in reducing metal corrosion in wells and methods of acidizing wells using the compositions.

2. Description of the Prior Art.

The treatment of subterranean hydrocarbon containing formations penetrated by a well bore with an aqueous acid solution to stimulate the production of hydrocarbons therefrom is well known to those skilled in the art. One such treatment known as "acidizing" involves the introduction of an aqueous acid solution into the subterranean formation under pressure so that the acid solution flows through the pore spaces of the formation. The acid solution reacts with acid soluble materials contained in the formation thereby increasing the size of the pore spaces and the permeability of the formation. Another production stimulation treatment known as "fracture-acidizing" involves the formation of one or more fractures in the formation and the introduction of an aqueous acid solution into the fractures to etch the fracture faces whereby flow channels are formed when the fractures close. The aqueous acid solution also enlarges the pore spaces in the fracture faces and in the formation.

A problem encountered in acidizing and fracture-acidizing treatments is the corrosion of metal tubular goods and other equipment used to carry out the treatments. The expense associated with repairing or replacing corrosion damaged tubular goods and equipment can be very high. The corrosion rate of such tubular goods and equipment is increased by elevated temperatures encountered in deep formations, and the corrosion results in at least the partial neutralization of the aqueous acid solution before it reacts with acid-soluble materials in the formations to be treated.

A variety of corrosion inhibited aqueous acid compositions and methods of using such compositions have been developed and used successfully heretofore. For example, U.S. Pat. No. 4,498,997 issued to Walker on Feb. 12, 1985 discloses an aqueous acid solution containing a corrosion inhibitor comprising an acetylenic alcohol, a quaternary ammonium compound, an aromatic hydrocarbon and an antimony compound intensifier.

U.S. Pat. Nos. 5,366,643 issued to Walker on Nov. 22, 1994 and 5,411,670 issued to Walker on May 2, 1995 both relate to corrosion inhibited aqueous acid compositions which utilize a source of antimony ions to increase the corrosion inhibiting effectiveness of the compositions.

U.S. Pat. No. 5,441,929 issued to Walker on Aug. 15, 1995 discloses a method of protecting, both ferrous based alloys and titanium alloys from acid corrosion utilizing an effective amount of a first inhibitor component including at least one reducing compound and a second inhibitor component including a source of molybdate ions.

While the above described and other corrosion inhibited aqueous acid compositions have been successful when used in sulfide free wells, the corrosion inhibiting effectiveness of the compositions and methods is drastically reduced in sour wells, i.e., sulfide-containing wells. Consequently, in order to preserve the effectiveness of the compositions and methods when treating sour wells, sulfide scavengers have typically been employed. When injected into a sulfide-containing well, a sulfide scavenger reacts with and removes the sulfides thereby preventing interference with the corrosion inhibiting composition used. Typically, a relatively large volume of sulfide scavenger is required for effectively treating a well making the use of the sulfide scavenger very expensive. Generally, the particular amount of sulfide scavenger used must be an amount sufficient to react with substantially all of the sulfide contained in the well. Since the actual quantity of sulfide contained in a sour well is seldom known with certainty, the amount of sulfide scavenger added to the well is usually excessive making the expense even greater.

Other problems also attend the use of sulfide scavengers. For example, sulfide scavengers can yield reaction products which polymerize and thereby damage the permeability of a treated formation. Further, sulfide scavenger reaction products can themselves be corrosive and/or toxic. Thus, there is a need for improved corrosion inhibited aqueous acid compositions and methods for treating wells including sulfide-containing wells which minimize corrosion without the use of sulfide scavengers and the like.

SUMMARY OF THE INVENTION

The present invention provides improved corrosion inhibiting well acidizing compositions and methods of using the compositions which meet the needs described above and overcome the deficiencies of the prior art. The corrosion inhibited well acidizing compositions of this invention are used for treating wells to increase the production of hydrocarbons therefrom, e.g., performing acidizing or acid fracturing procedures in subterranean formations penetrated by a well bore. The compositions are basically comprised of an aqueous acid solution, a corrosion inhibitor comprising at least one quaternary ammonium compound and a corrosion inhibitor intensifier which is effective in both sulfide-containing wells and wells which do not contain sulfides. The corrosion inhibitor intensifier is an acid or salt selected from the group consisting of aliphatic carboxylic acids having in the range of from about 12 to about 20 carbon atoms and salts of such acids, crude tall oil, tall oil fatty acids, rosin acids and mixtures of such acids and salts.

As mentioned, the presence of the corrosion inhibitor intensifier in the aqueous acid compositions of this invention protects the corrosion inhibitor from the normally deleterious effect of contact by sulfides such as hydrogen sulfides present in sour wells. Consequently, the corrosion inhibited aqueous acid compositions of this invention can be utilized for acidizing or fracture acidizing sulfide-containing wells without the necessity of removing the sulfides from the well with sulfide scavengers.

The corrosion inhibitor in the aqueous acid composition can include, in addition to the quaternary ammonium compound or compounds, additional compounds selected from the group consisting of unsaturated carbonyl compounds, unsaturated ether compounds, unsaturated alcohols, and condensation aldehyde products. Further, solvents, dispersing agents and other components commonly used in acidizing compositions can be included.

The methods of this invention permit the acidizing or fracture-acidizing of a subterranean formation penetrated by a well bore with an aqueous acid solution whereby the corrosive effect of the aqueous acid solution on metal contacted by the acid solution is minimized. The methods can be utilized for acidizing or fracture-acidizing sulfide-containing wells without the need to remove the sulfides from the wells using expensive sulfide scavengers. The methods basically comprise the steps of combining effective amounts of a corrosion inhibitor and a corrosion inhibitor intensifier as described above with an aqueous acid solution, and then contacting the formation to be acidized or fracture-acidized as well as metal tubular goods and equipment with the aqueous acid solution containing the corrosion inhibitor and corrosion inhibitor intensifier.

It is, therefore, a general object of the present invention to provide improved corrosion inhibited well acidizing compositions and methods.

A further object of the present invention is the provision of corrosion inhibited aqueous acid compositions and methods for treating a subterranean formation with an aqueous acid solution whereby the corrosive effect of the aqueous acid solution on metal contacted thereby is minimized, even in the presence of sulfides such as hydrogen sulfide.

Other and further objects, features and advantages of the present invention will be readily apparent to those skilled in the art upon a reading of the description of preferred embodiments which follows.

DESCRIPTION OF PREFERRED EMBODIMENTS

The present invention provides an improved corrosion inhibited well acidizing composition comprised of an aqueous acid solution, a corrosion inhibitor including at least one quaternary ammonium compound and a corrosion inhibitor intensifier which intensifies the metal corrosion protection afforded by the corrosion inhibitor, even in the presence of sulfide compounds which normally diminish the corrosion inhibiting effectiveness of the corrosion inhibitor. As a result, when a sour well is being acidized, it is unnecessary to treat the well with a sulfide scavenger such as an aldehyde, a triazine or the like.

The acid employed in the aqueous acid solutions of the present invention is preferably selected from the group consisting of hydrochloric acid, hydrofluoric acid, acetic acid and mixtures of such acids. The present invention is particularly effective with an aqueous hydrochloric acid solution having a hydrochloric acid concentration in the range of from about 5% to about 35% by weight of the solution, preferably from about 15% to about 35% by weight of the solution.

The water utilized to form the aqueous acid solution can be any aqueous fluid which does not adversely react with the acid, corrosion inhibitor or corrosion inhibitor intensifier. For example, the water can be fresh water, brine, salt-containing water solutions such as sodium chloride solutions, potassium chloride solutions or ammonium chloride solutions, brackish water or the like.

The corrosion inhibitor comprises at least one quaternary ammonium compound of the formula:

wherein each R is the same or a different group selected from long chain alkyl groups, cycloalkyl groups, aryl groups or heterocyclic groups, and X is an anion such as a halide. The term "long chain" is used herein to mean hydrocarbon groups having in the range of from about 12 to about 20 carbon atoms.

Examples of quaternary ammonium compounds which can be included in the corrosion inhibitor are N-alkyl, N-cycloalkyl and N-alkylaryl pyridinium halides such as N-cyclohexyl-pyridinium bromide, N-octylpyridinium bromide, N-nonylpyridinium bromide, N-decylpyridinium bromide, N-dodecyl-pyridinium bromide, N,N-didodecyldipyridinium dibromide, N-tetradecylpyridinium bromide, N-laurylpyridinium chloride, N-dodecylbenzylpyridinium chloride, N-dodecylquinolinium bromide, N-(1-methylnapthyl) quinolinium chloride, N-benzylquinolinium chloride and the like. Other quaternary ammonium compounds include monochloromethylated and bizchloromethylated pyridinium halides, ethoxylated and propoxylated quaternary ammonium compounds, didodecyldimethylammonium chloride, hexadecylethyldimethylammonium chloride, 2-hydroxy-3-(2-undecylamidoethylamino)-propane-1-triethylammonium hydroxide, 2-hydroxy-3- (2-heptadecylamidoethylamino)-propane-1-triethyl-ammonium hydroxide, and the like.

In addition to one or more of the quaternary ammonium compounds described above, the corrosion inhibitor may also include unsaturated carbonyl compounds such as 1-phenol-1-ene-3-butanone and cinnamaldehyde, unsaturated ether compounds such as 1-phenol-3-methoxy-1-propene, unsaturated alcohols such as acetylenic alcohols, condensation products formed by reacting an aldehyde in the presence of a carbonyl compound, and condensation products formed by reacting an aldehyde in the presence of a carbonyl compound and a nitrogen containing compound.

Acetylenic alcohols that can be used have the formula:

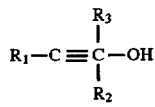

wherein $R_1$, $R_2$ and $R_3$ are hydrogen, alkyl, phenol, substituted phenol or hydroxyalkyl groups or radicals. Preferably, $R_1$ comprises a hydrogen radical, $R_2$ comprises a hydrogen radical, a methyl group, an ethyl group or a propyl group, and $R_3$ comprises an alkyl group having the general formula $C_nH_{2n}$ where n is an integer from 1 to 10. Specific examples include methylbutynol, methylpentynol, hexynol, ethyloctynol, propargyl alcohol, benzylbutynol, ethylcyclohexanol and the like. Preferred alcohols are hexynol, propargyl alcohol, methylbutynol and ethyloctonyl.

Examples of suitable condensation products formed by reacting an aldehyde in the presence of a carbonyl compound and a nitrogen containing compound are described in U.S. Pat. No. 3,077,454 issued to Monroe et al. on Feb. 12, 1963 which is incorporated herein by reference. When a condensation product is used, the quaternary ammonium compound of the corrosion inhibitor may comprise a portion of the condensation product.

The corrosion inhibitor is present in the aqueous acid compositions of this invention in an amount effective to inhibit corrosion by the aqueous acid solution on the ferrous or other metal surfaces to be contacted by the aqueous acid solution. Generally, the corrosion inhibitor is present in an amount in the range of from about 0.5% to about 2% by weight of the aqueous acid composition.

The corrosion inhibitor intensifier of this invention which intensifies the corrosion protection afforded by the corrosion inhibitor is comprised of one or more organic acids or salts including aliphatic carboxylic acids having in the range of from about 12 to about 20 carbon atoms and salts of such acids, crude tall oil, refined tall oil fatty acids, refined rosin acids, and mixtures of such acids and salts. Compounds that are precursors of the above described acids, e.g., esters of the acids, can also be utilized.

Aliphatic carboxylic acids and salts which are preferred for use in accordance with this invention include oleic acid (cis-9-octadecanoic acid) and salts, linoleic acid (9,12-octadecadienoic acid) and salts, linolinic acid (9,12,15-octadecatrienoic acid) and salts, and lauric acid (decanoic acid) and salts.

The most preferred acid materials for use as the corrosion inhibitor intensifier in accordance with the present invention are crude tall oil, rosin acids refined from crude tall oil, and refined tall oil fatty acids. As is well known by those skilled in the art, crude tall oil is a material produced by acid-treating the alkaline liquors obtained from the digestion (pulping) of pine wood. Crude tall oil is typically comprised of from about 35% to about 40% by weight rosin acids and from about 50% to about 60% by weight fatty acids. The crude tall oil and acids refined from it, i.e., rosin acids and tall oil fatty acids contain minute quantities of antioxidants (inhibitols) which stabilize the compositions and protect them against rancidity. Thus, the corrosion inhibitor intensifier of this invention formed of one or more of crude tall oil, rosin acids and/or tall oil fatty acids can be stored for relatively long periods of time before use. Further, crude tall oil, rosin acids and tall oil fatty acids have low toxicity levels and are inexpensive, readily available and highly effective in both sulfide-containing and nonsulfide-containing wells.

In addition to the components described above, the aqueous acid compositions of this invention can include solvents, surfactants and other components commonly used in acidizing compositions and known to those skilled in the art. For example, a solvent such as an alkyl alcohol, glycol or a mixture thereof can be employed in the aqueous acid compositions to assist in maintaining the various components of the compositions as homogeneous mixtures. Examples of such alcohols and glycols include methyl alcohol, ethyl alcohol, propyl alcohol, isopropyl alcohol, butyl alcohol, pentyl alcohol, heptyl alcohol, octyl alcohol, ethylene glycol, propylene glycol and the like. Preferably, if used, the alkyl alcohol, glycol or mixture thereof is added to the aqueous acid composition in an amount less than about 15% by volume of the corrosion inhibitor composition therein.

A nonionic surfactant such as the 8 to 20 mole ethylene oxide adducts of octylphenol, nonylphenol, tridecylphenol and the like are preferred. Sufficient nonionic surfactant can be admixed with the various components of the corrosion inhibitor to facilitate dispersion of the components in the aqueous acid solution. Preferably, if used, the surfactant comprises less than about 20% by volume of the corrosion inhibitor in the aqueous acid composition.

The corrosion inhibitor intensifier is included in an aqueous acid composition of this invention in an amount in the range of from about 3% to about 50% by weight of the corrosion inhibitor in the composition. Most preferably, the intensifier is included in the aqueous acid composition in an amount in the range of from about 20% to about 30% by weight of the corrosion inhibitor therein. The intensifier can be blended with the corrosion inhibitor at ambient temperature while stirring, and the resulting corrosion inhibitor and intensifier blend can then be combined with the aqueous acid solution in any suitable tank equipped with mixing means. The resulting corrosion inhibited aqueous acidizing composition is then pumped into a well bore and into a subterranean formation to be treated with the composition.

The corrosion inhibitor and corrosion inhibitor intensifier are preferably included in an aqueous acid composition of this invention in an amount sufficient to reduce the corrosion rate of ferrous metal in the well to a level not exceeding about 0.050 pound/ft$^2$ hr. As mentioned above, the corrosion inhibitor is generally included in the aqueous acid composition in an amount in the range of from about 0.05% to about 2% by weight of the composition and the corrosion inhibitor intensifier is included in the aqueous acid composition in an amount in the range of from about 20% to about 35% by weight of the composition.

The present invention provides methods of acidizing or fracture-acidizing a subterranean formation or zone penetrated by a well bore with an aqueous acid composition whereby the corrosive effect of the aqueous acid composition on metal contacted thereby is minimized. If the formation or zone being acidized contains sulfides, the corrosive effect of the aqueous acid solution on metal is still minimized without the need to remove the sulfides from the formation or zone such as by introducing sulfide scavengers therein.

The methods basically comprise the steps of combining effective amounts of a corrosion inhibitor including at least one quaternary ammonium compound and a corrosion inhibitor intensifier of this invention with an aqueous acid solution and then contacting the formation or zone to be acidized including metal tubular goods and equipment associated therewith with the aqueous acid composition.

In order to further illustrate the aqueous acid compositions and methods of this invention, the following examples are given.

EXAMPLE 1

A first prior art corrosion inhibitor composition comprised of 22% methanol, 18.5% benzylquinolinium chloride (80% active in isopropyl alcohol), 19.5% surfactant blend, 2% heavy aromatic naptha, 4% kerosene and 4% isopropyl alcohol (all by weight of the composition) was prepared. Seven parts by weight of the first prior art corrosion inhibitor were then blended at room temperature with three parts by weight of various corrosion inhibitor intensifiers of this invention.

A 0.2 milliliter portion of the above described first prior art corrosion inhibitor was combined with 100 milliliters of an aqueous hydrochloric acid solution containing 15% by weight acid. 0.3 milliliter portions of each of the above mentioned mixtures of corrosion inhibitor and intensifier were combined with additional 100 milliliter portions of the 15% by weight hydrochloric acid solution. Finally, a 0.3 milliliter portion of a second prior art corrosion inhibitor comprised of 0.2 milliliters of the first prior art inhibitor and 0.1 milliliters of a blend of 14% propargyl alcohol, 6% ethyloctynol and 10% isopropyl alcohol (by weight of the blend) was combined with 100 milliliters of the 15% hydrochloric acid solution.

The various corrosion inhibited hydrochloric acid test compositions produced are identified in Table I below. As indicated above, in order to, approximately equalize the concentrations of quaternary ammonium compound in all the test compositions, the amount of the first prior art corrosion inhibitor utilized in composition 1 was 0.2% by volume whereas 0.3% amounts of the first prior art corrosion inhibitor were used in compositions 2–8 as well as the second prior art corrosion inhibitor in composition 9.

The various corrosion inhibited hydrochloric acid test compositions were heated to 175° F., and a preweighed N-80 steel corrosion coupon was immersed in each composition while maintaining the temperature of the compositions at 175° F. for 4 hours. At the end of the 4 hour test periods, the corrosion coupons were removed, rinsed and weighed to determine the amount of corrosion which took place during the test. The results of these tests are set forth in Table I below.

TABLE I

Corrosion In The Absence Of Sulfide

| Composition Number | Corrosion Inhibitor/ Intensifier in Composition | Corrosion After Four Hours, lb/ft² hr |
|---|---|---|
| 1 | First Prior Art Corrosion Inhibitor Only | 0.059 |
| 2 | First Prior Art Corrosion Inhibitor/Tall Oil Fatty Acids | 0.009 |
| 3 | First Prior Art Corrosion Inhibitor/Oleic Acid | 0.011 |
| 4 | First Prior Art Corrosion Inhibitor/Linoleic Acid | 0.011 |
| 5 | First Prior Art Corrosion Inhibitor/Linolenic Acid | 0.013 |
| 6 | First Prior Art Corrosion Inhibitor/Lauric Acid | 0.019[1] |
| 7 | First Prior Art Corrosion Inhibitor/Ricinoleic Acid | 0.017[2] |
| 8 | First Prior Art Corrosion Inhibitor/Rosin Acid | 0.011 |
| 9 | Second Prior Art Corrosion Inhibitor | 0.003 |

[1]Precipitate formed.
[2]Separation occurred.

As shown in Table I, by comparing composition 1 containing the first prior art corrosion inhibitor to compositions 2–8 containing the same corrosion inhibitor and various corrosion inhibitor intensifiers, it can be seen that a substantially greater degree of corrosion protection was produced by the corrosion inhibited aqueous acid compositions of this invention than was obtained by the aqueous acid solution containing the first prior art corrosion inhibitor only. As also shown in Table I, the second prior art corrosion inhibitor (composition 9) performed very well. However, as will be shown in the following examples, the effectiveness of both the first and second prior art inhibitors diminishes dramatically in the presence of sulfides.

EXAMPLE 2

The tests described in Example 1 were repeated except that a 0.91 gram amount of a sulfur compound (thiourea) was added to each 100 milliliter portion of aqueous hydrochloric acid solution to simulate well sulfides. The results of these tests are set forth in Table II below.

TABLE II

Corrision In The Presence Of Thiourea

| Composition Number | Corrosion Inhibitor/ Intensifier in Composition | Corrosion After Four Hours, lb/ft² hr |
|---|---|---|
| 1 | First Prior Art Corrosion Inhibitor Only | 0.365 |
| 2 | First Prior Art Corrosion Inhibitor/Tall Oil Fatty Acids | 0.033 |
| 3 | First Prior Art Corrosion Inhibitor/Oleic Acid | 0.026 |
| 4 | First Prior Art Corrosion Inhibitor/Linoleic Acid | 0.027 |
| 5 | First Prior Art Corrosion Inhibitor/Linolenic Acid | 0.027 |
| 6 | First Prior Art Corrosion Inhibitor/Lauric Acid | 0.054[1] |
| 7 | First Prior Art Corrosion Inhibitor/Ricinoleic Acid | 0.024[2] |
| 8 | First Prior Art Corrosion Inhibitor/Rosin Acid | 0.023 |
| 9 | Second Prior Art Corrosion Inhibitor | 0.141 |

[1]Precipitate formed.
[2]Separation occurred.

As indicated in Table II, the first and second prior art corrosion inhibitors, i.e., compositions 1 and 9, failed to provide corrosion protection in the presence of thiourea. However, the aqueous acid compositions of this invention (compositions 2–8) provided excellent corrosion protection with the exception of lauric acid which formed a precipitate during the test.

EXAMPLE 3

The tests described in Example 1 were repeated except that 1.4 grams of another sulfur compound (hexahydropyrimidine-2-thione) were added to each 100 milliliter portion of aqueous hydrochloric acid solution. The results of these tests are set forth in Table III below.

TABLE III

Corrosion In The Presence Of Hexahydropyrimidine-2-Thione

| Composition Number | Corrosion Inhibitor/ Intensifier in Composition | Corrosion After Four Hours, lb/ft² hr |
|---|---|---|
| 1 | First Prior Art Corrosion Inhibitor Only | 0.137 |
| 2 | First Prior Art Corrosion Inhibitor/Tall Oil Fatty Acids | 0.068 |
| 3 | First Prior Art Corrosion Inhibitor/Oleic Acid | 0.075 |
| 4 | First Prior Art Corrosion Inhibitor/Linoleic Acid | 0.076 |
| 5 | First Prior Art Corrosion Inhibitor/Linolenic Acid | 0.041 |
| 6 | First Prior Art Corrosion Inhibitor/Lauric Acid | 0.057[1] |
| 7 | First Prior Art Corrosion Inhibitor/Ricinoleic Acid | 0.098[2] |
| 8 | First Prior Art Corrosion Inhibitor/Rosin Acid | 0.027 |
| 9 | Second Prior Art Corrosion Inhibitor | 0.079 |

[1]Precipitate formed.
[2]Separation occurred.

As indicated in Table III each of compositions 2–8 perform substantially better than did composition 1, i.e., the first prior art corrosion inhibitor. The linolinic acid intensifier composition (composition 5) and the rosin acid intensifier composition (composition 8) provided excellent results.

EXAMPLE 4

The tests described in Example 1 were repeated except that in order to generate hydrogen sulfide in the test solutions, a 0.90 gram amount of thioacetamide was added to each 100 milliliter portion of aqueous hydrochloric acid solution. The results of these tests are given in Table IV.

TABLE IV

Corrosion In The Presence Of Thioacetamide

| Composition Number | Corrosion Inhibitor/ Intensifier in Composition | Corrosion After Four Hours, lb/ft² hr |
|---|---|---|
| 1 | First Prior Art Corrosion Inhibitor Only | 0.133 |
| 2 | First Prior Art Corrosion Inhibitor/Tall Oil Fatty Acids | 0.014 |
| 3 | First Prior Art Corrosion Inhibitor/Oleic Acid | 0.013 |
| 4 | First Prior Art Corrosion Inhibitor/Linoleic Acid | 0.015 |
| 5 | First Prior Art Corrosion Inhibitor/Linolenic Acid | 0.014 |
| 6 | First Prior Art Corrosion Inhibitor/Lauric Acid | 0.026[1] |
| 7 | First Prior Art Corrosion Inhibitor/Ricinoleic Acid | 0.045[2] |
| 8 | First Prior Art Corrosion Inhibitor/Rosin Acid | 0.013 |
| 9 | Second Prior Art Corrosion Inhibitor | 0.071 |

[1]Precipitate formed.
[2]Separation occurred.

As shown in Table IV, the first and second prior art corrosion inhibitors failed to provide adequate corrosion protection in the presence of hydrogen sulfide. However, the compositions of the present invention (compositions 2–8) all provided good to excellent corrosion protection except that composition 6 containing a lauric acid intensifier formed a precipitate and composition 7 containing a ricinoleic acid intensifier separated during the first hour of the test.

EXAMPLE 5

The tests described in Example 1 were repeated except that 1 milliliter of mercaptocarboxylic acid was added to each 100 milliliter portion of aqueous hydrochloric acid solution. The results of these tests are set forth in Table V.

TABLE V

Corrosion In The Presence Of Thioglycolic Acid

| Composition Number | Corrosion Inhibitor/ Intensifier in Composition | Corrosion After Four Hours, lb/ft² hr |
|---|---|---|
| 1 | First Prior Art Corrosion Inhibitor Only | 0.448 |
| 2 | First Prior Art Corrosion Inhibitor/Tall Oil Fatty Acids | 0.019 |
| 3 | First Prior Art Corrosion Inhibitor/Oleic Acid | 0.022 |
| 4 | First Prior Art Corrosion Inhibitor/Linoleic Acid | 0.023 |
| 5 | First Prior Art Corrosion Inhibitor/Linolenic Acid | 0.023 |
| 6 | First Prior Art Corrosion Inhibitor/Lauric Acid | 0.045[1] |
| 7 | First Prior Art Corrosion Inhibitor/Ricinoleic Acid | 0.213[2] |
| 8 | First Prior Art Corrosion Inhibitor/Rosin Acid | 0.035 |
| 9 | Second Prior Art Corrosion Inhibitor | 0.146 |

[1]Precipitate formed.
[2]Separation occurred.

As indicated in Table V, the first and second prior art corrosion inhibitors (compositions 1 and 9) failed to provide adequate corrosion protection. The aqueous acid compositions of the present invention (compositions 2–8) all provided good to excellent results except that composition 6 containing lauric acid intensifier formed a precipitate during the test and composition 7 containing ricinoleic acid intensifier separated during the test.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of treating a sulfide containing subterranean formation penetrated by a well bore with an aqueous acid solution including one or more inorganic acids whereby the corrosive effect of the aqueous acid solution on metal contacted thereby is minimized comprising the steps of:

combining a corrosion inhibitor and a corrosion inhibitor intensifier with said aqueous acid solution, said corrosion inhibitor comprising at least one quaternary ammonium compound and said corrosion inhibitor intensifier being selected from the group consisting of aliphatic carboxylic acids having in the range of from about 12 to about 20 carbon atoms and salts of said acids, crude tall oil, tall oil fatty acids, rosin acids and mixtures of said acids and salts; and contacting said metal and said formation with said aqueous acid solution containing said corrosion inhibitor and said corrosion inhibitor intensifier.

2. The method of claim 1 wherein said quaternary ammonium compound in said corrosion inhibitor has the formula $$(R)_4 N^+ X^-$$

wherein each R is the same or a different group selected from the group consisting of long chain alkyl groups, cycloalkyl groups, aryl groups and heterocyclic groups and X is an anion.

3. The method of claim 1 wherein said corrosion inhibitor further comprises one or more additional compounds selected from the group consisting of unsaturated carbonyl compounds, unsaturated ether compounds, unsaturated alcohols, condensation products formed by reacting an aldehyde in the presence of a carbonyl compound and condensation products formed by reacting an aldehyde in the presence of a carbonyl compound and a nitrogen containing compound.

4. The method of claim 1 wherein said corrosion inhibitor is combined with said aqueous acid solution in an amount in the range of from about 0.05% to about 2% by weight of said composition.

5. The method of claim 1 wherein said corrosion inhibitor intensifier is combined with said aqueous acid solution in an amount in the range of from about 20% to about 35% by weight of said corrosion inhibitor in said composition.

6. The method of claim 1 wherein said aqueous acid solution is an aqueous hydrochloric acid solution containing from about 5% to about 35% acid by weight of said solution.

* * * * *